(12) United States Patent
Kim et al.

(10) Patent No.: US 9,068,085 B2
(45) Date of Patent: Jun. 30, 2015

(54) RADIATION CURABLE RESIN COMPOSITION, AND FINGERPRINT-RESISTANT RESIN COMPOSITION CONTAINING SAME

(75) Inventors: Jin Tae Kim, Gwangyang-si (KR); Moon Jae Kwon, Daegu (KR); Jae Ryung Lee, Goyang-si (KR); Han Seob Song, Ansan-si (KR); Young Woo Lee, Suwon-si (KR); Chang Se Byun, Gwangyang-si (KR); Jung Su Kim, Gwangyang-si (KR)

(73) Assignees: POSCO, Pohang-si (KR); Samhwa Paints Industries Co., LTD., Ansan-si (KR)

( * ) Notice: Subject to any disclaimer, the term of this patent is extended or adjusted under 35 U.S.C. 154(b) by 587 days.

(21) Appl. No.: 13/502,230

(22) PCT Filed: Oct. 16, 2009

(86) PCT No.: PCT/KR2009/005994
§ 371 (c)(1),
(2), (4) Date: Jun. 25, 2012

(87) PCT Pub. No.: WO2011/046243
PCT Pub. Date: Apr. 21, 2011

(65) Prior Publication Data
US 2012/0258324 A1 Oct. 11, 2012

(51) Int. Cl.
| | |
|---|---|
| *B32B 15/08* | (2006.01) |
| *C08L 33/14* | (2006.01) |
| *C08K 7/00* | (2006.01) |
| *C08K 3/26* | (2006.01) |
| *C08K 3/34* | (2006.01) |
| *C08K 3/36* | (2006.01) |
| *C08K 3/22* | (2006.01) |
| *C08F 2/50* | (2006.01) |
| *C09D 4/00* | (2006.01) |
| *C09D 175/16* | (2006.01) |
| *C08F 220/18* | (2006.01) |

(52) U.S. Cl.
CPC ............ *C09D 4/00* (2013.01); *C08F 220/18* (2013.01); *C09D 175/16* (2013.01)

(58) Field of Classification Search
CPC ......... C08L 75/04; C08L 75/14; C08L 75/16; C08F 2/48; C08F 220/18; C08F 265/00; C09D 4/00; C09D 175/14; C09D 175/16; C09D 133/08; C09D 1/1216; B32B 27/08; B32B 27/30
USPC ............ 428/425.8, 425.9; 522/173; 524/556, 524/872, 881; 523/220; 528/28, 30; 525/455, 457

See application file for complete search history.

(56) References Cited

U.S. PATENT DOCUMENTS

| 6,426,373 | B1 | 7/2002 | Stange et al. |
| 7,897,243 | B2 | 3/2011 | Matsumoto |
| 2004/0225039 | A1 | 11/2004 | Hackbarth et al. |
| 2006/0110537 | A1 | 5/2006 | Huang et al. |

FOREIGN PATENT DOCUMENTS

| JP | 08092342 A | 4/1996 |
| JP | 11043627 A | 2/1999 |
| JP | 11124514 A | 5/1999 |
| JP | 2000297246 A | 10/2000 |
| JP | 2005054029 A | 3/2005 |
| WO | 2007040159 A1 | 4/2007 |

*Primary Examiner* — Thao T Tran
(74) *Attorney, Agent, or Firm* — The Webb Law Firm

(57) ABSTRACT

A radiation-curable base resin composition and a fingerprint-resistant resin composition including the same are provided. The radiation-curable base resin composition includes a multifunctional urethane(meth)acrylate having three or more functional groups at 3 to 35 parts by weight, a bifunctional urethane(meth)acrylate at 3 to 35 parts by weight, at least one (meth)acrylic acid ester monomer selected from a monofunctional (meth)acrylic acid ester monomer and a multifunctional (meth)acrylic acid ester monomer at 20 to 60 parts by weight and a radiation polymerization initiator at 0.1 to 15 parts by weight.

15 Claims, No Drawings

RADIATION CURABLE RESIN COMPOSITION, AND FINGERPRINT-RESISTANT RESIN COMPOSITION CONTAINING SAME

BACKGROUND

1. Field of the Invention

The present invention relates to a radiation-curable resin composition and a fingerprint-resistant resin composition including the same, and more specifically, it relates to a radiation-curable resin composition which is used to form a coating film on a surface of a metal, particularly, stainless steel, so as to provide the metal not only high-hardness but also excellent physical properties such as close adhesion to a base, scratch resistance, light fastness, heat resistance, flexural processability and a fingerprint-resistant bonding property, and a fingerprint-resistant resin composition including the same.

2. Discussion of Related Art

Stainless steel is a very important material in current industries, which has an advantage in that the surface of the material has an innate metallic texture without any surface treatment such as painting due to its high resistance to corrosion, which is one of the characteristics of stainless steel. Thus, stainless steel has been widely used for kitchen sinks, cookware and tableware, and also it has been used as a construction material such as a material used for building the exterior of the building, and in elevators and escalators. In addition, stainless steel has been widely used as an industrial material for chemical and petrochemical facilities, food and medical equipment, drinking water and wastewater disposal plants, automobile and airplane parts, etc.

In particular, stainless steel has been prepared by adding a certain amount of chromium (11% or more) to a general steel so as to give an elegant metallic texture and to prevent discoloration and corrosion. This was developed in the early $20^{th}$ century and it has been named "stainless steel" to distinguish it from other forms of steel. Heretofore, stainless steel has been produced into over 100 products, and it has been classified in a variety of ways in the metallographic aspect.

As such, stainless steel is prepared by alloying two or more components so as to solve the problem of corrosion, which is one of the major drawbacks of iron. Thus, stainless steel, depending on the surface treatment, has been generally used for high-gloss products with mirror-like surfaces, brush patterns and designable products through an etching process.

Meanwhile, there has been an increasing demand for stainless steel having good metallic texture and excellent appearance as consumers' demands for better products is increasing with recent technical developments. Although, conventional stainless steel has an excellent metal metallic luster, it has a problem in that it is vulnerable to contamination. Therefore, recently, further technical development is being called upon to solve this problem.

As one example, a method of coating the surface of a metal, particularly, stainless steel, with an oil-type polyester-melamine-curable resin composition is mainly used to prevent or reduce contamination by fingerprints.

However, the conventional oil-type resin composition, that is paint, contains a material that causes contamination of the atmosphere and global warming, and thus there is a need to solve the problem in an environmentally friendly manner.

Therefore, to solve the aforementioned problems, a method using a radiation-curable resin composition which is environmentally friendly and can be mass-produced has been developed. A radiation-curable resin composition, particularly ultraviolet (UV) ray-curable, that is paint, was developed in Korea and further developed and widely used for applications such as wooden and plastic materials, starting from the development of a radiation-curable paint for paper, particularly, a UV-curable paint in the early 1980s. However, the development of a UV-curable paint with respect to metals has been intermittently made due to its poor adhesive strength and poor processability caused by rapid curing and radical polymerization, which are innate characteristics of the UV-curable paint, and the technical development of the UV-curable paint has limits.

In particular, a thermosetting paint has been partly used as a coating material of the resin composition used for stainless steel to show colors, but it is known that some coating materials for preventing contamination of stainless steel kitchen appliances have been developed recently.

Meanwhile, more so abroad than in Korea, research on a technique for applying a UV-curable paint for metal materials has been continuously done to work towards an environmentally friendly paint concept. In recent years, there has been a steady attempt to apply this technique to top coat automobiles, etc.

In particular, it is known that a fingerprint-resistant UV-curable paint was developed to solve contamination, which is a drawback of stainless steel, and some products were produced and sold by the first half of 2006.

Therefore, as examples of the techniques for treating a surface of stainless steel with the above-described radiation-curable resin composition, particularly UV-curable, US Patent Application Publication Nos. 2004-0225039 and 2007-0016947 disclose that a hydrolysis-resistant, scratch-resistant and anti-contamination coating layer is formed by directly applying a resin composition to a metal or plastic surface and crosslinking the resin composition with radiation, particularly, UV rays. However, the resin composition has problems in that the processability and adhesivity, which are the most important physical properties of a steel product, are deteriorated.

As other examples, US Patent Application Publication No. 2006-0110537 discloses a fingerprint-resistant coating structure including a layer formed of a material selected from the group consisting of a hydrophobic nano-compound, an oleophobic nano-compound and a super-amphiphobic nano-compound, Japan Patent Publication Nos. PEI11-43627 and PEI11-124514 disclose a radiation-curable resin composition including an acrylic acid ester of a bisphenol A diglycidyl ether polymer, and Japan Patent Publication No. 2005-054029 discloses a coating composition including an active energy ray-curable polymerizable monomer having a main chain in which the hydrogen in an alcoholic hydroxyl group is substituted with an alkaline metal atom. However, the above-described prior arts have problems in that the techniques are for plastic and they are difficult to apply to metal, particularly stainless steel, which requires adhesive strength and pliability.

SUMMARY OF THE INVENTION

The present invention is directed to provide a radiation-curable resin composition for forming a coating film on the surface of a metal material, particularly stainless steel. Here, the radiation-curable resin composition has high hardness and shows good physical properties such as close adhesion to a metal material, scratch resistance, light fastness, heat resistance and pliability.

Also, the present invention is directed to provide a fingerprint-resistant resin composition for forming a coating film to minimize the drawbacks of fingerprint-resistance and the bonding property of a metal material, particularly, stainless steel. Here, the fingerprint-resistant resin composition has high hardness and shows good physical properties such as close adhesion to a metal material, scratch resistance, light fastness, heat resistance, pliability, fingerprint-resistance and a bonding property.

In addition, the present invention is directed to provide a method of coating the fingerprint-resistant resin composition onto a metal base.

Furthermore, the present invention is directed to provide a fingerprint-resistant metal base having the fingerprint-resistant resin composition formed therein.

One aspect of the present invention provides a radiation-curable base resin composition including:

a multifunctional urethane(meth)acrylate having three or more functional groups at 3 to 35 parts by weight;

a bifunctional urethane(meth)acrylate at 3 to 35 parts by weight;

at least one (meth)acrylic acid ester monomer selected from the group consisting of a monofunctional (meth)acrylic acid ester monomer and a multifunctional (meth)acrylic acid ester monomer at 20 to 60 parts by weight; and a radiation polymerization initiator at 0.1 to 15 parts by weight.

Another aspect of the present invention provides a fingerprint-resistant resin composition including:

the radiation-curable base resin composition of the present invention at 100 parts by weight; and inorganic nanoparticles at 0.1 to 15 parts by weight.

Still another aspect of the present invention provides a method of forming a fingerprint-resistant coating film. Here, the method includes coating the fingerprint-resistant resin composition of the present invention onto the surface of a metal base and curing the resin composition by irradiation with radiation.

Yet another aspect of the present invention provides a fingerprint-resistant metal substrate characterized by the fingerprint-resistant resin composition of the present invention formed on one or both surfaces of a metal base.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and similarly, a second element could be termed a first element, without departing from the scope of the exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to limit the exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

The present invention provides a radiation-curable base resin composition including:

a multifunctional urethane(meth)acrylate having three or more functional groups at 3 to 35 parts by weight;

a bifunctional urethane(meth)acrylate at 3 to 35 parts by weight;

at least one (meth)acrylic acid ester monomer selected from the group consisting of a monofunctional (meth)acrylic acid ester monomer and a multifunctional (meth)acrylic acid ester monomer at 20 to 60 parts by weight; and a radiation polymerization initiator at 0.1 to 15 parts by weight.

The multifunctional urethane(meth)acrylate having three or more functional groups may be a mixture of a trifunctional urethane(meth)acrylate and a hexafunctional urethane(meth)acrylate. The trifunctional urethane(meth)acrylate and the hexafunctional urethane(meth)acrylate may be mixed at a weight ratio of 1 to 4:1. When the weight ratio is less than 1:1, the hardness of the coating film increases due to the very high content of hexafunctional groups, but the close adhesion of the coating film may be degraded. On the other hand, when the weight ratio exceeds 4:1, the close adhesion of the coating film is improved, but the scratch resistance is difficult to secure due to the poor hardness of the coating film.

Also, the multifunctional urethane(meth)acrylate having three or more functional groups may have an isocyanurate structure and a urethane bond in the structure.

In addition, the multifunctional urethane(meth)acrylate having three or more functional groups may be a reaction product of a multinuclear complex of alkylene diisocyanate and a (meth)acrylate having a hydroxyl group.

In this case, a trimer of hexamethylene diisocyanate may be used as the multinuclear complex of alkylene diisocyanate, and a hydroxy(meth)alkyl acrylate or a hydroxy polycaprolactone(meth)acrylate may be used as the (meth)acrylate having a hydroxyl group, but the present invention is not limited thereto.

In particular, as the multifunctional urethane(meth)acrylate having three or more functional groups, a multifunctional urethane acrylate in a hexamethylene diisocyanate polymerization trimer has an isocyanurate structure and a urethane bond. Therefore, the multifunctional urethane acrylate has good weather resistance and also shows tenacity and pliability so that the coating film formed on the radiation-curable base resin composition has hardness and flexural processability. Any conventional material used for this purpose is not particularly limited. Preferably, materials synthesized by a reaction of an isocyanate compound in the multinuclear complex, such as the trimer of hexamethylene diisocyanate that is an aliphatic diisocyanate with a monofunctional monomer having a hydroxyl group, for example, hydroxyethyl acrylate, hydroxypropyl acrylate, hydroxybutyl acrylate or hydroxy polycaprolactone acrylate, may be used herein.

In this case, when the multifunctional urethane(meth)acrylate having three or more functional groups is used at a content of less than 3 parts by weight, the hardness and scratch resistance may be degraded due to a poor curing property. On the other hand, when the content of the multifunctional urethane(meth)acrylate exceeds 35 parts by weight, the flexural processability and adhesivity may be degraded.

The bifunctional urethane(meth)acrylate of the present invention may be a reaction product of an alicyclic or aromatic diisocyanate and a (meth)acrylate having a hydroxyl group.

In this case, the alicyclic or aromatic diisocyanate that may be used herein includes isophorone diisocyanate, dicyclohexane diisocyanate, or hydrogenated xylene diisocyanate, but the present invention is not limited thereto.

In particular, the bifunctional urethane(meth)acrylate of the present invention has two functional groups, and thus functions to reduce a level of crosslinking linkage during radiation polymerization, thereby maintaining the pliability. Any conventional bifunctional urethane(meth)acrylate used for this purpose may be used without any particular limitation.

More particularly, an alicyclic or aromatic diisocyanate prepolymer-containing bifunctional urethane acrylate may be used as the bifunctional urethane(meth)acrylate of the present invention. Here, a compound synthesized by an addition reaction of a diisocyanate having an alicyclic or aromatic structure, for example, isophorone diisocyanate (IPDI), dicyclohexane diisocyanate (Desmodur W) or hydrogenated xylene diisocyanate (HXDI) with a hydroxyl group-containing acrylic acid ester, may be used herein.

Here, the urethane(meth)acrylate having the above-described structure is manufactured in various forms and supplied from a plurality of acrylate oligomer manufacturers.

When the bifunctional urethane(meth)acrylate is used at a content of less than 3 parts by weight, the flexural processability and adhesive strength may be deteriorated. On the other hand, when the content of the bifunctional urethane (meth)acrylate exceeds 35 parts by weight, the hardness and scratch resistance may be degraded due to a poor curing property.

The (meth)acrylic acid ester monomer of the present invention may be used as a reactive diluent during the radiation curing of the base resin composition of the present invention. Any conventional monomer used for this purpose and known in the art is not particularly limited. Preferably, the (meth) acrylic acid ester monomer includes a monofunctional(meth) acrylic acid ester monomer, a multifunctional (meth)acrylic acid ester monomer, or a mixture thereof.

More particularly, as a material that may be used as the monofunctional and/or multifunctional acrylic acid ester monomer, the monofunctional acrylic acid ester monomer that may be used herein may include acrylamide, dimethylaminoethyl (meth)acrylate, hydroxyethyl (meth)acrylate, hydroxypropyl (meth)acrylate, hydroxybutyl (meth)acrylate, hydroxy polycaprolactone monoacrylate, isobornyl (meth) acrylate, isobornyloxy(meth)acrylate, lauryl(meth)acrylate, dicyclopentadiene(meth)acrylate, tetrahydrofurfuryl(meth) acrylate, phenoxyethyl(meth)acrylate, butoxyethyl(meth) acrylate, polyethylene glycol monoacrylate, polypropylene glycol monoacrylate, or a mixture thereof.

Also, the multifunctional acrylic acid ester monomer that may be used herein may include ethylene glycol di(meth) acrylate, dicyclopentenyl di(meth)acrylate, triethylene glycol di(meth)acrylate, tetraethylene glycol di(meth)acrylate, trimethylolpropane di(meth)acrylate, trimethylolpropane tri (meth)acrylate, trimethylolpropane trioxypropyl tri(meth) acrylate, trimethylolpropane trioxyethyl tri(meth)acrylate, tripropylene glycol di(meth)acrylate, ditrimethylolpropane tetra(meth)acrylate, neopentyl glycol di(meth)acrylate, neopentyl glycol propoxylate di(meth)acrylate, bisphenol A diglycidyl ether di(meth)acrylate, butanediol di(meth)acrylate, hexanediol di(meth)acrylate, hexamethylene diol di(meth) acrylate, pentaerythritol tri(meth)acrylate, pentaerythritol tetra(meth)acrylate, dipentaerythritol penta(meth)acrylate, dipentaerythritol hexa(meth)acrylate, or a mixture thereof.

The (meth)acrylic acid ester monomer may be used alone, or may be a mixture of a monofunctional (meth)acrylic acid ester monomer and a multifunctional (meth)acrylic acid ester monomer.

In this case, the monofunctional (meth)acrylic acid ester monomer may be present at a content of 50 to 90 parts by weight, based on 100 parts by weight of the total (meth) acrylic acid ester monomer. When the content of the monofunctional (meth)acrylic acid ester monomer is less than 50 parts by weight, the flexural processability and adhesive strength may be degraded. On the other hand, when the content of the monofunctional (meth)acrylic acid ester monomer exceeds 90 parts by weight, the hardness and scratch resistance may be degraded due to a poor curing property.

Also, when the multifunctional (meth)acrylic acid ester monomer is used at a content of less than 20 parts by weight based on 100 parts by weight of the total (meth)acrylic acid ester monomer, the hardness and scratch resistance may be degraded due to a poor curing property. On the other hand, when the content of the multifunctional (meth)acrylic acid ester monomer exceeds 60 parts by weight, the flexural processability and adhesive strength may be degraded.

Meanwhile, the radiation-curable base resin composition of the present invention may further include a bifunctional epoxy(meth)acrylate including an aromatic compound. Here, the bifunctional epoxy(meth)acrylate may be present at a content of 3 to 50 parts by weight, based on 100 parts by weight of the total base resin composition.

Here, the aromatic compound includes one derived from at least one aromatic compound selected from the group consisting of bisphenol A, Novolac, naphthalene and fluorene.

In particular, when the radiation-curable base resin composition of the present invention, which includes the bifunctional epoxy(meth)acrylate including the aromatic compound, is applied to the surface of a metal material, particularly stainless steel, to form a coating film, which may be endowed with an optical property. The bifunctional epoxy (meth)acrylate including the aromatic compound widely used in the art for this purpose, more preferably at least one aromatic compound selected from the group consisting of bisphenol A, Novolac, naphthalene and fluorene, may be used without limitation. Preferably, a material having a high refractive index may be used herein, and an epoxy acrylate may be recommended for use.

In this case, the epoxy acrylate may be prepared by an addition reaction of a bisphenol A-type epoxy prepared by synthesizing the bisphenol A and epichlorohydrin in the presence of a sodium hydroxide catalyst, for example, a YD-128 (Kukdo Chemical Co. Ltd., Republic of Korea), KER-828 (Kumho ENC Co. Ltd., Republic of Korea) or EPR-174 (Hexion Korea, Republic of Korea) epoxy, with acrylic acid using a basic catalyst and a polymerization inhibitor.

Here, when a multinuclear complex such as a Novolac resin, naphthalene or fluorine is used instead of the bisphenol A, a modified acrylic acid ester may be used as an oligomer resin having a high refractive index.

Meanwhile, the epoxy acrylate has a structurally high hardness and contains a polar group, and thus has a good property such as adhesive strength to a metal material, particularly stainless steel. A related product being sold in the market may be used as such an epoxy acrylate. Therefore, examples of the epoxy acrylate include Miramer PE-210, PE-240, PE-250 series (Miwon Chemicals Co. Ltd., Republic of Korea); CN104, CN111, CN112, CN115, CN116, CN117, CN118, CN119, CN120, CN124, etc. (Sartomer, US); SR-09 (Samhwa Paint Ind. Co. Ltd., Republic of Korea), etc.

When the epoxy acrylate is used at a content of less than 3 parts by weight, it is difficult to obtain an improved adhesive strength to a metal and obtain an optical effect by using the epoxy acrylate. On the other hand, when the content of the epoxy acrylate exceeds 50 parts by weight, the yellowing of the epoxy acrylate may lower the light fastness and degrade the flexural processability.

Also, the radiation-curable base resin composition of the present invention may further include an adhesion-promoting monomer having at least one functional group selected from the group consisting of a carboxyl group, a hydroxyl group and a phosphate group. Here, the adhesion-promoting monomer is present at a content of 0.1 to 15 parts by weight, based on 100 parts by weight of the total base resin composite.

The adhesion-promoting monomer having a carboxyl group includes (meth)acrylic acid, dimer acrylic acid, etc., the monomer having a hydroxyl group includes hydroxyethyl (meth)acrylate, hydroxypropyl (meth)acrylate, hydroxybutyl (meth)acrylate, hydroxy polycaprolactone monoacrylate, etc., and the monomer having a phosphate group includes hydroxyethyl acryloyl phosphate, hydroxyethyl methacrylate phosphate, etc., but the present invention is not limited thereto.

In addition, when the adhesion-promoting monomer is used at a content of less than 0.1 parts by weight, it is impossible to obtain an adhesion-promoting effect. On the other hand, when the content of the adhesion-promoting monomer exceeds 15 parts by weight, the surface of the material may be changed in quality, the transparency of the coating film may be deteriorated, or the physical properties such as moisture resistance and chemical resistance may be degraded.

The radiation polymerization initiator of the present invention is used so that a polymerization reaction of a radiation-curable resin composition can take place when the resin composition is applied to the surface of a metal material, particularly stainless steel, to form a coating film and irradiated with radiation, particularly UV rays. Any polymerization initiators used for this purpose may be used without limitation. Preferably, a radical polymerization initiator or an ionic polymerization initiator may be used herein. However, the ionic polymerization initiator serves as a catalyst that induces ionic polymerization of a cyclic oxirane structure, and thus generates photocations to initiate the polymerization when irradiated with UV rays. Therefore, since the drying rate is slower in the ionic polymerization initiator than the radical polymerization initiator, the radical polymerization initiator may be recommended for use. Here, the radical polymerization initiator may be used at a content of 0.1 to 15 parts by weight, based on the total weight of the radiation-curable resin composition.

In this case, the radiation polymerization initiator may also be mixed and used with a photosensitizer.

Here, examples of the radical polymerization initiator include 1-hydroxy cyclohexyl phenyl ketone, 2,2-dimethoxy-2-phenylacetophenone, 2-hydroxy-2-methyl-1-phenylpropane-1-one, 1-(4-isopropylphenyl)-2-hydroxy-2-methylpropane-1-one, 1,1-dimethoxydeoxybenzoin, 3,3'-dimethyl-4-methoxybenzophenone, 1-(4-dodecylphenyl)-2-hydroxy-2-methylpropane-1-one, 2-methyl-1-[4-(methylthio)phenyl]-2-morpholino-propane-1-one, 2,4,6-trimethylbenzoyldiphenyl phosphine oxide, ethyl-2,4,6-trimethylbenzoyl phenylphosphinate, bis-(2,6-dimethoxybenzoyl)-2,4,4-trimethylpentyl phosphine oxide, bisacylphosphine oxide, methylbenzoylformate, 4-benzoyl-4'-methyldiphenylsulfide, benzyldimethylketal, fluorenone, fluorene, benzaldehyde, benzoin ethyl ether, benzoin propyl ether, 2-benzyl-2-dimethylamino-1-(4-morpholinophenyl)-butan-1-one, acetophenone, 3-methyl acetophenone, benzophenone, 4,4'-dimethoxybenzophenone, 4,4'-diaminobenzophenone, 3,3',4,4'-tetra(t-butylperoxycarbonyl) benzophenone (BTTB), acetophenonebenzylketal, triphenylamine, carbazole, 4-chlorobenzophenone, anthraquinone, xanthone, diethylthioxanthone, 2-isopropylthioxanthone, 4-isopropylthioxanthone, 2-chlorothioxanthone, 1-chloro-4-propoxythioxanthone, and a mixture of BTTB and a pigment sensitizer such as xanthene, thioxanthene, coumarin, ketocoumarin, benzyl dimethyl ketone, benzophenone, 1-hydroxycyclohexylphenylketone, 2,4,6-trimethylbenzoyldiphenyl phosphine oxide, ethyl-2,4,6-trimethylbenzoylphenylphosphate, bis-(2,6-dimethoxybenzoyl)-2,4,4-trimethylpentyl phosphine oxide, 2-methyl-1-[4-(methylthio)phenyl]-2-morpholinopropane-1-one, 2-benzyl-2-dimethylamino-1-(4-morpholinophenyl)-butan-1-one, or a combination of two or more kinds thereof, which may be used alone or in combination.

Meanwhile, the radiation polymerization initiator that may be Irgacures 184, 651, 500, 907, 369 and 784, 2959 Ubecryl P36 (Ciba-Geigy), Lucirin TPO, LR8893 (BASF), Darocurs 1116 and 1173 (Merk), ESCACURE KIP150 or ESCACURE KIP 100F which are typically used in the market.

Also, when the radiation polymerization initiator is used at a content of less than 0.1 parts by weight, the photocuring may be insignificant. On the other hand, when the content of the radiation polymerization initiator exceeds 15 parts by weight, the adhesive strength may be degraded due to the photocuring, or the curing by residues may rather be inhibited.

As necessary, the radiation-curable base resin composition of the present invention may further include an adhesion promoter so as to improve chemical and physical linkage between the coating film and the metal material, particularly stainless steel. Here, the adhesion promoter may be present at a content of 0.1 to 15 parts by weight, based on 100 parts by weight of the radiation-curable base resin composition.

In this case, a material that does not cause a change in quality of the surface of a metal material, particularly stainless steel, and/or a problem regarding the transparency of the coating film, for example an adhesion promoter such as an organic/inorganic composite, for example a silane coupling agent and/or an organic metal coupling agent, may be used as the adhesion promoter.

A representative material that may be used as the organic metal coupling agent may include an organic metal such as aluminum (Al), zirconium (Zr), zinc (Zn) and/or titanium (Ti).

Also, a coupling agent having a methacryl group including an unsaturated group and a methacryl group including a vinyl group may be used as the silane coupling agent. Here, a methacryl group, a vinyl group, an amino group and/or an epoxy group are all used as an organic group in the silane coupling agent, and an organic group that can be used for radical polymerization may be recommended for use.

Meanwhile, the radiation-curable base resin composition of the present invention may further include various additives, for example, an antioxidant, a photostabilizer, a UV absorbing agent, a thermal polymerization inhibitor, a leveling agent, an antifoaming agent, a dispersing agent, an antistatic agent, a plasticizer, an organic filler or a mixture thereof, as necessary. In this case, a content of the additive may be varied to an extent to which the radiation-curable resin composition of the present invention does not change the desired physical properties, for example, a range of 0.1 to 15 parts by weight based on the total weight of the radiation-curable base resin composition, depending on the user's choice.

Representative examples of the antioxidant that may be used herein may include Irganox 1010, Irganox 1035, Irganox 1076 and Irganox 1222 (Ciba-Geigy, Japan), examples of the photostabilizer may include Tinuvin 292, Tinuvin 144, Tinuvin 622LD (Ciba-Geigy, Japan), Sanol LS-770, Sanol LS-765, Sanol LS-292, and Sanol LS-744 (Sankyo Corp., Japan), the UV absorbing agent may include Tinuvin P, Tinuvin 234, Tinuvin 320, Tinuvin 328 (Ciba-Geigy, Japan), Sumisorb 110, Sumisorb 130, Sumisorb 140, Sumisorb 220, Sumisorb 250, Sumisorb 320 and Sumisorb 400 (Sumitomo Corp., Japan), the thermal polymerization inhibitor may include HQ, THQ, HQMME, etc., and the leveling agent, the antifoaming agent and the dispersing agent may be selected from products commercially available from conventional paint additive manufacturers, such as BYK.

Also, the antistatic agent that may be used may include a non-ionic antistatic agent such as polyoxyethylenealkylether, polyoxyethyleneamine, glycerine or sorbitol fatty acid ester, an anion antistatic agent such as alkyl sulfonate, alkylbenzene sulfonate, alkylsulfate or alkylphosphate, a quaternary ammonium salt or a mixture thereof.

As necessary, the radiation-curable resin composition of the present invention may further include an additive such as an acrylic resin, an epoxy resin, a ketone resin, an intermediate of silicon or a mixture thereof so as to enhance shrinkage-preventing and adhesion-promoting effects. In this case, the content of the additive may be varied to an extent to which the radiation-curable resin composition of the present invention does not change the desired physical properties, depending on the user's choice.

Also, the present invention is directed to provide a fingerprint-resistant resin composition obtained by mixing the radiation-curable base resin composition of the present invention at 100 parts by weight with inorganic nanoparticles at 0.1 to 15 parts by weight.

Here, the inorganic nanoparticles function to improve the tenacity and abrasion resistance of the coating film formed from the fingerprint-resistant resin composition, and the inorganic nanoparticles adjust visibility to the naked-eye by diffusing some incident light without losing transparency. Any inorganic nanoparticles used for this purpose may be used without limitation. Preferably, silica, alumina, magnesium carbonate, calcium carbonate, talc, titanium oxide or a mixture thereof may be used herein. Also, the size of the inorganic nanoparticles is not particularly limited, but may preferably be in the range of 10 nm to 3 μm. More preferably, the inorganic nanoparticles may be a mixture of inorganic nanoparticles having a size of 10 nm to 300 nm and inorganic nanoparticles having a size of 400 nm to 3 μm.

Also, the inorganic nanoparticles are not particularly limited as long as they are prepared using a conventional method known in the art, for example, a physical or chemical method. More specific examples of the manufacturing method include a physical method, for example, a method of grinding micro-sized inorganic nanoparticles using a fine grinding mill, a chemical method, for example, a sol-gel method using an organic metal salt, or a vapor phase oxidation method, for example, a method of synthesizing inorganic nanoparticles.

In this case, the nano-sized particles have the same components as the micro-sized particles but show entirely different properties such as a physicochemical property. As a result, when the inorganic nanoparticles of the present invention have a size of 10 to 300 nm, the opacity generated in the micro-sized particles may be completely removed by passing visible rays, having smaller wavelength than the visible region, through the inorganic nanoparticles as one of the properties.

Meanwhile, in the case of the transparent coating film made of a specular material, since incident light is refracted and reflected along with an optical path to a refractive index of the transparent coating film, the reflected light is substantially reflected at the same angle as the incident light. As a result, when a fingerprint mark is generated on the specular material, the fingerprint fluid components are contaminated at micro-levels of the fingerprint on the specular material so that the fingerprints can be observed more clearly by diffusing the incident light and reflected light.

Therefore, a method to compensate for the visibility of a fingerprint contaminant using specular reflection includes a method of reducing diffusion of incident light and reflected light by decreasing affinity of the fingerprint fluid to a material to reduce the transfer of the fingerprint fluid onto the material, and a method of reducing affinity of a fingerprint fluid to components of the coating film coated on a specular material to the maximum so as to reduce fingerprint resistance of the specular material and diffusing incident light inside the coating film to increase the diffusion of the incident light to an extent in which the transparency of the coating film is not damaged. Here, the latter method may be used to reduce visibility for the naked-eye when the incident light in the material is diffused at the same level as the reflected light in a fingerprint-contaminated region and a non-contaminated region.

Therefore, the present invention may obtain an effect of increasing the ability to recognize fingerprints with nanoparticles using micro-sized particles at a level in which the user requires to achieve the above-described objects. In this case, it is desirable to decrease the difference in refractive index between the micro-sized particles and the organic coating film so as to achieve the effect. This is because the lower the refractive index, the lower the damage of the transparency. As a result, suitable micro-sized particles should be selected and used.

Also, the shape of the particles is not particularly limited, but may be properly selected and used according to the user's demand since the refractive index and transparency may be affected by a spherical or planar shape.

Also, the present invention is directed to provide a method of forming a fingerprint-resistant coating film including coating the fingerprint-resistant resin composition of the present invention onto the surface of a metal base and curing the fingerprint-resistant resin composition by irradiation with radiation and a fingerprint-resistant metal substrate prepared by the method.

As configured above, the radiation-curable base resin composition of the present invention and the fingerprint-resistant resin composition including the radiation-curable base resin composition and inorganic nanoparticles are applied to thea surface of a metal material, particularly stainless steel, to form a coating film. A coating method widely used in the art, for example, dip coating, spray coating, roll coating or bar coating, may be used as the coating method used to form the coating film. In this case, the coating film may have a thickness of 3 to 50 μm, preferably 3 to 7 μm.

More particularly, when the radiation-curable base resin composition and/or the fingerprint-resistant resin composition of the present invention is used to form a thin coating film, the radiation curing may be performed under a nitrogen atmosphere, for example, by replacing the inside of a radiation-curable drying oven with nitrogen so as to prevent poor curing and formation of the final coating film having poor physical properties, which are caused because radical polymerization is prevented by the presence of oxygen in the air under the photocuring condition.

Also, UV rays may be used as the radiation for curing the radiation-curable resin composition of the present invention. Here, the UV rays may have a wavelength of 400 nm or less.

According to a certain aspect, as a light source for irradiating the UV rays, a metal halide lamp, a medium-pressure mercury lamp, a high-pressure mercury lamp or an electrodeless H bulb, D bulb or V bulb (Fusion, US) may be selected and used according to the use and curing conditions.

A radiation intensity of the irradiated UV rays may be generally in the range of 0.1 to 10 J/cm$^2$, and may be properly adjusted according to the components of the radiation-curable resin composition and the user's choice.

Hereinafter, the present invention will be described in further detail with reference to examples. However, it should be understood that the following examples are merely provided to specifically describe the present invention, but not intended to limit the scope of the present invention.

Example 1

As listed in the following Table 1, 15 parts by weight of acrylic acid ester of a polycyclic aromatic compound (SUPER RESIN 09, Samhwa Paint Ind. Co. Ltd., Republic of Korea); 24 parts by weight of multifunctional trifunctional urethane acrylate (SUPER RESIN 1315, Samhwa Paint Ind. Co. Ltd., Republic of Korea); 6 parts by weight of hexafunctional urethane acrylate (SUPER RESIN 1341, Samhwa Paint Ind. Co. Ltd., Republic of Korea); 5 parts by weight of bifunctional urethane acrylate (SUPER RESIN 1327, Samhwa Paint Ind. Co. Ltd., Republic of Korea); 25 parts by weight of a monofunctional acrylic acid ester monomer (IBOA, SK-UCB, Republic of Korea); 10 parts by weight of a multifunctional acrylic acid ester monomer (TPGDA, Miwon Chemicals Co. Ltd., Republic of Korea); 5 parts by weight of an adhesion-promoting monomer (EBECRYL 168, SK-UCB, Republic of Korea); 5 parts by weight of a radiation polymerization initiator (IRGACURE 184, CIBA, Switzerland); 2 parts by weight of a silane coupling agent (SILQUEST A-171, GE SILICONES, US); and 3 parts by weight of an antioxidant (IRGANOX 1035, CIBA, Switzerland) were mixed to prepare a radiation-curable resin composition.

Next, the radiation-curable resin composition was applied to the surface of stainless steel (SUS-304 No. 4, POSCO, Republic of Korea) having a size of 10 cm×20 cm (width× length) using a bar coater (wire bar coater #3, MEYER BARS, US).

Subsequently, the stainless steel coated with the radiation-curable resin composition was irradiated with UV rays at a radiation intensity of 100 to 2,000 mJ/cm$^2$, using a UV transilluminator (Fusion 600vps, Fusion, US), to form a coating film having a thickness of 5 μm, thereby treating the surface of the stainless steel.

Examples 2 to 7

These experiments were performed in the same manner as in Example 1, except that the components of each radiation-curable resin composition are as listed in Table 1.

Comparative Example 1

As listed in the following Table 1, 50 parts by weight of acrylic acid ester of a polycyclic aromatic compound (SUPER RESIN 09, Samhwa Paint Ind. Co. Ltd., Republic of Korea); 25 parts by weight of monofunctional acrylic acid ester monomer (IBOA, SK-UCB, Republic of Korea); 10 parts by weight of multifunctional acrylic acid ester monomer (TPGDA, Miwon Chemicals Co. Ltd., Republic of Korea); 5 parts by weight of an adhesion-promoting monomer (EBECRYL 168, SK-UCB, Republic of Korea); 5 parts by weight of a radiation polymerization initiator (IRGACURE 184, CIBA, Switzerland); 2 parts by weight of a silane coupling agent (SILQUEST A-171, GE SILICONES, US); and 3 parts by weight of an antioxidant (IRGANOX 1035, CIBA, Switzerland) were mixed to prepare a radiation-curable resin composition.

Next, the radiation-curable resin composition was applied to the surface of stainless steel (SUS-304 No. 4, POSCO, Republic of Korea) having a size of 10 cm×20 cm (width× length) using a bar coater (wire bar coater #3, MEYER BARS, US).

Subsequently, the stainless steel coated with the radiation-curable resin composition was irradiated with UV rays at a radiation intensity of 100 to 2,000 mJ/cm$^2$, using a UV transilluminator (Fusion 600vps, Fusion, US), to form a coating film having a thickness of 5 μm, thereby treating the surface of the stainless steel.

Comparative Examples 2 and 3

These experiments were performed in the same manner as in Comparative Example 1, except that the components of each radiation-curable resin composition are as listed in Table 1.

TABLE 1

Components of radiation-curable resin compositions according to Examples and Comparative Examples

| | Examples | | | | | | | Comparative Examples | | |
|---|---|---|---|---|---|---|---|---|---|---|
| | 1 | 2 | 3 | 4 | 5 | 6 | 7 | 1 | 2 | 3 |
| Acrylic acid ester of polycyclic aromatic compound | 15 | 20 | 25 | 15 | 10 | 0 | — | 50 | — | 5 |
| Trifunctional urethane acrylate | 24 | 16 | 7 | 10 | 10 | 10 | 10 | — | 40 | 5 |
| Hexafunctional urethane acrylate | 6 | 4 | 3 | 5 | 5 | 5 | 10 | — | — | — |
| Bifunctional urethane acrylate | 5 | 10 | 15 | 20 | 25 | 30 | 30 | — | 10 | 40 |
| Monofunctional acrylic acid ester monomer | 25 | 25 | 25 | 25 | 25 | 25 | 20 | 25 | 25 | 25 |
| Multifunctional acrylic acid ester monomer | 10 | 10 | 10 | 10 | 10 | 10 | 15 | 10 | 10 | 10 |
| Adhesion-promoting monomer | 5 | 5 | 5 | 5 | 5 | 5 | 5 | 5 | 5 | 5 |
| Radiation polymerization initiator | 5 | 5 | 5 | 5 | 5 | 5 | 5 | 5 | 5 | 5 |
| Silane coupling agent | 2 | 2 | 2 | 2 | 2 | 2 | 2 | 2 | 2 | 2 |
| Antioxidant | 3 | 3 | 3 | 3 | 3 | 3 | 3 | 3 | 3 | 3 |

Comparative Example 4

As listed in the following Table 2, 15 parts by weight of acrylic acid ester of a polycyclic aromatic compound (SUPER RESIN 09, Samhwa Paint hid. Co. Ltd., Republic of Korea); 15 parts by weight of multifunctional urethane acrylate (SUPER RESIN 1315, Samhwa Paint Ind. Co. Ltd., Republic of Korea); 20 parts by weight of bifunctional urethane acrylate (SUPER RESIN 1327, Samhwa Paint Ind. Co. Ltd., Republic of Korea); 35 parts by weight of a monofunctional acrylic acid ester monomer (IBOA, SK-UCB, Republic of Korea); 5 parts by weight of an adhesion-promoting monomer (EBECRYL 168, SK-UCB, Republic of Korea); 5 parts by weight of a radiation polymerization initiator (IRGACURE 184, CIBA, Switzerland); 2 parts by weight of a silane coupling agent (SILQUEST A-171, GE SILICONES, US); and 3 parts by weight of an antioxidant (IRGANOX 1035, CIBA, Switzerland) were mixed to prepare a radiation-curable resin composition.

Next, the radiation-curable resin composition was applied to the surface of stainless steel (SUS-304 No. 4, POSCO, Republic of Korea) having a size of 10 cm×20 cm (width× length) using a bar coater (wire bar coater #3, MEYER BARS, US).

Subsequently, the stainless steel coated with the radiation-curable resin composition was irradiated with UV rays at a radiation intensity of 100 to 2,000 mJ/cm$^2$, using a UV transilluminator (Fusion 600vps, Fusion, US), to form a coating film having a thickness of 5 μm, thereby treating the surface of the stainless steel.

Comparative Examples 5 to 11

These experiments were performed in the same manner as in Comparative Example 4, except that the components of each radiation-curable resin composition using monofunctional acrylic acid ester monomers (HPA, NIPPON SHOKUBAI, Japan and THFA, OSAKA ORGANIC, Japan) and multifunctional acrylic acid ester monomers (TPGDA, Miwon Chemicals Co. Ltd., Republic of Korea; HDDA, Miwon Chemicals Co. Ltd., Republic of Korea; NPG(PO) 2DA, Miwon Chemicals Co. Ltd., Republic of Korea; TMPTA, Miwon Chemicals Co. Ltd., Republic of Korea; and DPHA, Miwon Chemicals Co. Ltd., Republic of Korea) are as listed in Table 2, respectively.

TABLE 2

Components of radiation-curable resin compositions according to Comparative Examples

| | | Comparative Examples | | | | | | | |
|---|---|---|---|---|---|---|---|---|---|
| | | 4 | 5 | 6 | 7 | 8 | 9 | 10 | 11 |
| Acrylic acid ester of polycyclic aromatic compound | | 15 | 15 | 15 | 15 | 15 | 15 | 15 | 15 |
| Multifunctional urethane acrylate | | 15 | 15 | 15 | 15 | 15 | 15 | 15 | 15 |
| Bifunctional urethane acrylate | | 20 | 20 | 20 | 20 | 20 | 20 | 20 | 20 |
| Mono functional acrylic acid ester monomer | IBOA | 35 | | | | | | | |
| | HPA | | 35 | | | | | | |
| | THFA | | | 35 | | | | | |
| Multifunctional acrylic acid ester monomer | TPGDA | | | | 35 | | | | |
| | HDDA | | | | | 35 | | | |
| | NPG(PO)2DA | | | | | | 35 | | |
| | TMPTA | | | | | | | 35 | |
| | DPHA | | | | | | | | 35 |
| Adhesion-promoting monomer | | 5 | 5 | 5 | 5 | 5 | 5 | 5 | 5 |
| Radiation polymerization initiator | | 5 | 5 | 5 | 5 | 5 | 5 | 5 | 5 |
| Silane coupling agent | | 5 | 5 | 5 | 5 | 5 | 5 | 5 | 5 |
| Antioxidant | | 5 | 5 | 5 | 5 | 5 | 5 | 5 | 5 |

Example 8

As listed in the following Table 3, 15 parts by weight of acrylic acid ester of a polycyclic aromatic compound (SUPER RESIN 09, Samhwa Paint Ind. Co. Ltd., Republic of Korea); 15 parts by weight of multifunctional urethane acrylate (SUPER RESIN 1315, Samhwa Paint Ind. Co. Ltd., Republic of Korea); 20 parts by weight of bifunctional urethane acrylate (SUPER RESIN 1327, Samhwa Paint Ind. Co. Ltd., Republic of Korea); 25 parts by weight of a monofunctional acrylic acid ester monomer (IBOA, SK-UCB, Republic of Korea); 10 parts by weight of a multifunctional acrylic acid ester monomer (TPGDA, Miwon Chemicals Co. Ltd., Republic of Korea); 5 parts by weight of an adhesion-promoting monomer (EBECRYL 168, SK-UCB, Republic of Korea); 5 parts by weight of a radiation polymerization initiator (IRGACURE 184, CIBA, Switzerland); 2 parts by weight of a silane coupling agent (SILQUEST A-171, GE SILICONES, US); and 3 parts by weight of an antioxidant (IRGANOX 1035, CIBA, Switzerland) were mixed to prepare a radiation-curable resin composition.

Next, the radiation-curable resin composition was applied to the surface of stainless steel (SUS-304 No. 4, POSCO, Republic of Korea) having a size of 10 cm×20 cm (width× length) using a bar coater (wire bar coater #3, MEYER BARS, US).

Subsequently, the stainless steel coated with the radiation-curable resin composition was irradiated with UV rays at a radiation intensity of 100 to 2,000 mJ/cm$^2$, using a UV transilluminator (Fusion 600vps, Fusion, US), to form a coating film having a thickness of 5 μm, thereby treating the surface of the stainless steel.

Examples 9 to 12

These experiments were performed in the same manner as in Example 8, except that the components of each radiation-curable resin composition using monofunctional acrylic acid ester monomers (HPA, NIPPON SHOKUBAI, Japan and THFA, OSAKA ORGANIC, Japan) and multifunctional acrylic acid ester monomers (HDDA, Miwon Chemicals Co. Ltd., Republic of Korea; NPG(PO)2DA, Miwon Chemicals Co. Ltd., Republic of Korea; TMPTA, Miwon Chemicals Co. Ltd., Republic of Korea; and DPHA, Miwon Chemicals Co. Ltd., Republic of Korea) are as listed in Table 3, respectively.

Comparative Example 12

As listed in the following Table 3, 15 parts by weight of acrylic acid ester of a polycyclic aromatic compound (SUPER RESIN 09, Samhwa Paint Ind. Co. Ltd., Republic of Korea); 15 parts by weight of multifunctional urethane acrylate (SUPER RESIN 1315, Samhwa Paint Ind. Co. Ltd., Republic of Korea); 20 parts by weight of bifunctional urethane acrylate (SUPER RESIN 1327, Samhwa Paint Ind. Co. Ltd., Republic of Korea); 30 parts by weight of a monofunctional acrylic acid ester monomer (IBOA, SK-UCB, Republic of Korea); 5 parts by weight of a multifunctional acrylic acid ester monomer (TMPTA, Miwon Chemicals Co. Ltd., Republic of Korea); 5 parts by weight of an adhesion-promoting monomer (EBECRYL 168, SK-UCB, Republic of Korea); 5 parts by weight of a radiation polymerization initiator (IRGACURE 184, CIBA, Switzerland); 2 parts by weight of a silane coupling agent (SILQUEST A-171, GE SILICONES, US); and 3 parts by weight of an antioxidant (IRGANOX 1035, CIBA, Switzerland) were mixed to prepare a radiation-curable resin composition.

Next, the radiation-curable resin composition was applied to the surface of stainless steel (SUS-304 No. 4, POSCO, Republic of Korea) having a size of 10 cm×20 cm (width× length) using a bar coater (wire bar coater #3, MEYER BARS, US).

Subsequently, the stainless steel coated with the radiation-curable resin composition was irradiated with UV rays at a radiation intensity of 100 to 2,000 mJ/cm$^2$, using a UV transilluminator (Fusion 600vps, Fusion, US), to form a coating film having a thickness of 5 μm, thereby treating the surface of the stainless steel.

Comparative Examples 12 to 16

These experiments were performed in the same manner as in Comparative Example 12, except that the components of each radiation-curable resin composition using monofunctional acrylic acid ester monomers (HPA, NIPPON SHOKUBAI, Japan and THFA, OSAKA ORGANIC, Japan); and multifunctional acrylic acid ester monomers (HDDA, Miwon Chemicals Co. Ltd., Republic of Korea; NPG(PO) 2DA, Miwon Chemicals Co. Ltd., Republic of Korea; TMPTA, Miwon Chemicals Co. Ltd., Republic of Korea; and DPHA, Miwon Chemicals Co. Ltd., Republic of Korea) are as listed in Table 3, respectively.

(SILQUEST A-171, GE SILICONES, US); and 3 parts by weight of an antioxidant (IRGANOX 1035, CIBA, Switzerland) were mixed to prepare the same radiation-curable resin composition as in Example 4.

Next, as listed in the following Table 4, inorganic nanoparticles (AEROSIL R 972, DEGUSA, Germany) having a particle size of 10 to 200 nm and inorganic nanoparticles (ML-386, Tokai Chemical Industry Company Ltd., Japan) having a particle size of 400 nm to 3 μm were further mixed at contents of 7 parts by weight and 3 parts by weight, respectively, based on 100 parts by weight of the radiation-curable resin composition of Example 4, to prepare a radiation-curable resin composition.

Thereafter, the radiation-curable resin composition was applied to the surface of stainless steel (SUS-304 No. 4, POSCO, Republic of Korea) having a size of 10 cm×20 cm (width×length) using a bar coater (wire bar coater #3, MEYER BARS, US).

Subsequently, the stainless steel coated with the radiation-curable resin composition was irradiated with UV rays at a radiation intensity of 100 to 2,000 mJ/cm$^2$, using a UV tran-

TABLE 3

Components of radiation-curable resin compositions according to Examples and Comparative Examples

| | | Examples | | | | | Comparative Examples | | | | |
|---|---|---|---|---|---|---|---|---|---|---|---|
| | | 8 | 9 | 10 | 11 | 12 | 12 | 13 | 14 | 15 | 16 |
| Acrylic acid ester of polycyclic aromatic compound | | 15 | 15 | 15 | 15 | 15 | 15 | 15 | 15 | 15 | 15 |
| Multifunctional urethane acrylate | | 15 | 15 | 15 | 15 | 15 | 15 | 15 | 15 | 15 | 15 |
| Bifunctional urethane acrylate | | 20 | 20 | 20 | 20 | 20 | 20 | 20 | 20 | 20 | 20 |
| Monofunctional acrylic acid ester monomer | IBOA | 25 | 25 | 20 | 20 | 20 | 30 | | 10 | | |
| | HPA | | | | | | | | | | 10 |
| | THFA | | | 5 | 5 | 5 | | 30 | | 10 | |
| Multifunctional acrylic acid ester monomer | TPGDA | 10 | | | | | | | 25 | | |
| | HDDA | | 10 | | | | | | | | 25 |
| | NPG(PO)2DA | | | 10 | | | | | | | |
| | TMPTA | | | | 10 | | 5 | | | 25 | |
| | DPHA | | | | | 10 | | 5 | | | |
| Adhesion-promoting monomer | | 5 | 5 | 5 | 5 | 5 | 5 | 5 | 5 | 5 | 5 |
| Radiation polymerization initiator | | 5 | 5 | 5 | 5 | 5 | 5 | 5 | 5 | 5 | 5 |
| Silane coupling agent | | 2 | 2 | 2 | 2 | 2 | 2 | 2 | 2 | 2 | 2 |
| Antioxidant | | 3 | 3 | 3 | 3 | 3 | 3 | 3 | 3 | 3 | 3 |

Example 13

15 parts by weight of acrylic acid ester of a polycyclic aromatic compound (SUPER RESIN 09, Samhwa Paint Ind. Co. Ltd., Republic of Korea); 15 parts by weight of multifunctional urethane acrylate (SUPER RESIN 1315, Samhwa Paint Ind. Co. Ltd., Republic of Korea); 20 parts by weight of bifunctional urethane acrylate (SUPER RESIN 1327, Samhwa Paint Ind. Co. Ltd., Republic of Korea); 25 parts by weight of a monofunctional acrylic acid ester monomer (IBOA, SK-UCB, Republic of Korea); 10 parts by weight of a multifunctional acrylic acid ester monomer (TPGDA, Miwon Chemicals Co. Ltd., Republic of Korea); 5 parts by weight of an adhesion-promoting monomer (EBECRYL 168, SK-UCB, Republic of Korea); 5 parts by weight of a radiation polymerization initiator (IRGACURE 184, CIBA, Switzerland); 2 parts by weight of a silane coupling agent silluminator (Fusion 600vps, Fusion, US), to form a coating film having a thickness of 5 μm, thereby treating the surface of the stainless steel.

Examples 14 to 18

These experiments were performed in the same manner as in Example 13, except that the components of each radiation-curable resin composition are as listed in Table 4.

Comparative Examples 17 to 19

These experiments were performed in the same manner as in Example 13, except that the components of each radiation-curable resin composition are as listed in Table 4.

TABLE 4

Components of radiation-curable resin compositions according to Examples and Comparative Examples

| | Examples | | | | | | Comparative Examples | | |
|---|---|---|---|---|---|---|---|---|---|
| | 13 | 14 | 15 | 16 | 17 | 18 | 17 | 18 | 19 |
| Resin composition of Example 4 | 100 | 100 | 100 | 100 | 100 | 100 | 100 | 100 | 100 |
| Inorganic nanoparticles (10 to 200 nm) | 7 | 76 | 75 | 74 | 73 | 72 | — | 10 | — |
| Inorganic nanoparticles (400 nm to 3 μm) | 3 | 74 | 75 | 76 | 72 | 73 | — | — | 10 |

Example 19

15 parts by weight of acrylic acid ester of a polycyclic aromatic compound (SUPER RESIN 09, Samhwa Paint Ind. Co. Ltd., Republic of Korea); 15 parts by weight of multifunctional urethane acrylate (SUPER RESIN 1315, Samhwa Paint Ind. Co. Ltd., Republic of Korea); 20 parts by weight of bifunctional urethane acrylate (SUPER RESIN 1327, Samhwa Paint Ind. Co. Ltd., Republic of Korea); 25 parts by weight of a monofunctional acrylic acid ester monomer (IBOA, SK-UCB, Republic of Korea); 10 parts by weight of a multifunctional acrylic acid ester monomer (TPGDA, Miwon Chemicals Co. Ltd., Republic of Korea); 5 parts by weight of an adhesion-promoting monomer (EBECRYL 168, SK-UCB, Republic of Korea); 5 parts by weight of a radiation polymerization initiator (IRGACURE 184, CIBA, Switzerland); 2 parts by weight of a silane coupling agent (SILQUEST A-171, GE SILICONES, US); and 3 parts by weight of an antioxidant (IRGANOX 1035, CIBA, Switzerland) were mixed to prepare the same radiation-curable resin composition as in Example 4.

Next, as listed in the following Table 5, inorganic nanoparticles (AEROSIL R 972, DEGUSA, Germany) having a particle size of 10 to 200 nm and inorganic nanoparticles (ML-386, Tokai Chemical Industry Company Ltd., Japan) having a particle size of 400 nm to 3 μm were further mixed at contents of 5 parts by weight and 5 parts by weight, respectively, based on 100 parts by weight of the radiation-curable resin composition of Example 4, to prepare a radiation-curable resin composition.

Thereafter, the radiation-curable resin composition was applied to the surface of stainless steel (SUS-304 No. 4, POSCO, Republic of Korea) having a size of 10 cm×20 cm (width×length) using a bar coater (wire bar coater #3, MEYER BARS, US).

Subsequently, the stainless steel coated with the radiation-curable resin composition was irradiated with UV rays at a radiation intensity of 100 to 2,000 mJ/cm$^2$, using a UV transilluminator (Fusion 600vps, Fusion, US), to form a coating film having a thickness of 5 μm, thereby treating the surface of the stainless steel.

Examples 20 to 21

These experiments were performed in the same manner as in Example 19, except that the components of each radiation-curable resin composition are as listed in Table 5.

Comparative Examples 20 and 21

These experiments were performed in the same manner as in Example 13, except that the components of each radiation-curable resin composition are as listed in Table 5.

TABLE 5

Components of radiation-curable resin compositions according to Examples and Comparative Examples

| | Examples | | | Comparative Examples | |
|---|---|---|---|---|---|
| | 19 | 20 | 21 | 20 | 21 |
| Resin composition of Example 4 | 100 | 100 | 100 | 100 | 100 |
| Inorganic nanoparticles (10 to 200 nm) | 5 | 2.5 | 7.5 | 0.05 | 10 |
| Inorganic nanoparticles (400 nm to 3 μm) | 5 | 2.5 | 7.5 | 0.05 | 10 |

Experiments

A coating film formed by coating the surface of stainless steel with each of the radiation-curable resin compositions prepared in Examples 1 to 21 and Comparative Examples 1 to 21 were measured for physical properties such as pencil hardness, scratch resistance, light fastness, heat resistance, processability, fingerprint-resistance and fingerprint-erasing property. The results are listed in Tables 3 and 4

(1) Pencil Hardness

Pencil hardness was evaluated according to a JIS K-5400 pencil hardness method using a pencil hardness tester. That is, a penciling level was evaluated with the naked eye when lines were drawn on a cured coating film using the kinds of pencils (B, HB, F, H, 2H and 3H) at an angle of 45° (Target level: H or higher).

(2) Adhesive Strength

Adhesive strength was evaluated according to a method of testing the adhesive strength of paint (ISO 2409). That is, lines were drawn on a test sample at interval of 1 mm (creating 100 1 mm×1 mm square pieces), and cellophane adhesive tape was attached and detached to the surface of the test sample. In this case, the adhesive strength was evaluated by counting the remaining pieces on the coated surface of the coating film that was divided into 100 pieces.

(3) Scratch Resistance

A cured coating film was scratched 20 times with nails in the same direction as the painting direction and the direction perpendicular to the painting direction, and the scratch marks on the coating film were observed. The observation results were determined according to the following evaluation criteria.

◯: There are no scratch marks.
Δ: There are slight scratch marks.
x: There are clear scratch marks.

(4) Light Fastness

A test sample was kept for 24 hours in a QUV Accelerated Weathering tester (UVA-340 lamp), and the color difference and yellowing was observed with the naked eye before/after the experiments. The observation results were determined according to the following evaluation criteria.

○: Yellowing is not observed with the naked eye and a value of ΔE is less than 1.5.

Δ: Yellowing is hardly observed with the naked eye and a value of ΔE is greater than 1.5.

x: Yellowing is easily observed with the naked eye and a value of ΔE is greater than 1.5.

(5) Heat Resistance

A test sample was kept for 1 hour in an oven at 100° C., and the appearance of yellowing was observed with the naked eye to determine the color difference before/after the experiments. The observation results were determined according to the following evaluation criteria.

○: Yellowing is not observed with the naked eye and a value of ΔE is less than 1.5.

Δ: Yellowing is hardly observed with the naked eye and a value of ΔE is greater than 1.5.

x: Yellowing is easily observed with the naked eye and a value of ΔE is greater than 1.5.

(6) Processability

A test sample was tested at levels of 0 T to 4 T using a T-Bend tester. That is, the test sample was bent, and observed with the naked eye to evaluate the peeling of the test sample. When there were no peels, the levels were applied to evaluate the corresponding test sample (Target level: 0 T to 3 T).

(7) Fingerprint-Resistance

Fingerprints were marked on the surface of a coating film, and observed at an angle of approximately 20° with the naked eye. The observation results were determined according to the following evaluation criteria.

○: Fingerprints are not clearly observed.

Δ: Fingerprints are faintly observed.

x: Fingerprints are clearly observed.

(8) Fingerprint-Erasing Property

Fingerprints were marked on the surface of a coating film. Thereafter, the coating film was scrubbed with a soft cloth, and the scrubbing number required to completely remove the fingerprints was determined. The counting results were determined according to the following evaluation criteria.

○: Coating film is scrubbed 5 times or less.

Δ: Coating film is scrubbed 10 times or less.

x: Coating film is scrubbed 10 times or more.

(9) Abrasion Resistance

A test sample having a coating film formed therein was cut into pieces having a size of 10 cm×10 cm (width×length), a line was diagonally drawn from each corner, and the corner of the test sample was cut by 1 cm. A hole having a diameter of 1 cm was formed at a point at which the diagonal lines cross over each other to prepare a test sample which was applicable to an abrasion tester. An abrasion resistance test was performed 1,000 times on the prepared test sample using CS-1 (#10) 250 g*2EA, and the difference in weight of the test sample before/after testing was recorded to observe the level of abrasion with the naked eye.

○: A weight of a test sample is reduced by 5 g or less, and an original plate is not exposed.

Δ: A weight of a test sample is reduced by 5 g or less, but an original plate is slightly exposed.

x: A weight of a test sample is reduced by 5 g or more, and an original plate is highly exposed.

TABLE 6

Experimental results (pencil hardness, adhesive strength, scratch resistance, light fastness, heat resistance and processability)

| | | Pencil hardness | Adhesive strength | Scratch resistance | Light fastness | Heat resistance | Processability |
|---|---|---|---|---|---|---|---|
| Examples | 1 | 3H | 100/100 | ○ | ○ | ○ | 3T |
| | 2 | 3H | 100/100 | ○ | ○ | ○ | 3T |
| | 3 | 2H | 100/100 | ○ | ○ | ○ | 2T |
| | 4 | 2H | 100/100 | ○ | ○ | ○ | 2T |
| | 5 | H | 100/100 | ○ | ○ | ○ | 1T |
| | 6 | H | 100/100 | ○ | ○ | ○ | 1T |
| | 7 | 2H | 100/100 | ○ | ○ | ○ | 2T |
| Comparative Examples | 1 | 3H | 100/100 | ○ | X | ○ | 4T |
| | 2 | 3H | 80/100 | ○ | ○ | ○ | 5T |
| | 3 | B | 100/100 | X | ○ | X | 0T |

As listed in Table 6, it was revealed that yellowing appeared and processability was deteriorated when a content of the acrylic acid ester of the polycyclic aromatic compound exceeded the proper range.

Also, it could be confirmed that there was probability of adversely affecting adhesive strength and processability when a content of the multifunctional aliphatic urethane acrylate having a tri- or more functional group exceeded the proper range. In addition, it could be seen that the coating film of Comparative Example 3 in which the alicyclic bifunctional urethane acrylate was present at a high content rather had a poor curing property, and thus hardness and scratch resistance can be degraded.

Therefore, it can be observed that an oligomer and a monomer were used at proper contents, and the oligomer was not used alone but used in combination with two or more oligomers to obtain a coating film having further improved physical properties.

TABLE 7

Experimental results (pencil hardness, adhesive strength, scratch resistance and processability)

| | | Pencil hardness | Adhesive strength | Scratch resistance | Processability |
|---|---|---|---|---|---|
| Comparative Examples | 4 | F | 100/100 | ○ | 1T |
| | 5 | H | 95/100 | ○ | 2T |
| | 6 | HB | 100/100 | Δ | 0T |
| | 7 | 2H | 80/100 | ○ | 3T |
| | 8 | 2H | 40/100 | ○ | 5T |
| | 9 | H | 90/100 | Δ | 2T |
| | 10 | 3H | 10/100 | ○ | 5T |
| | 11 | 4H | 0/100 | ○ | 5T |

From the results listed in Table 7, it was confirmed that the characteristics of each monomer were identified, and the (meth)acrylic acid ester monomer was used alone, but desirably used as a mixture of a monofunctional (meth)acrylic acid ester monomer and a multifunctional (meth)acrylic acid ester monomer, as listed in Table 7.

TABLE 8

Experimental results (pencil hardness, adhesive strength, scratch resistance and processability)

|  |  | Pencil hardness | Adhesive strength | Scratch resistance | Processability |
|---|---|---|---|---|---|
| Examples | 8 | 2H | 100/100 | ○ | 1T |
|  | 9 | 2H | 100/100 | ○ | 2T |
|  | 10 | H | 100/100 | ○ | 1T |
|  | 11 | 3H | 100/100 | ○ | 2T |
|  | 12 | 3H | 100/100 | ○ | 3T |
| Comparative Examples | 12 | H | 100/100 | Δ | 2T |
|  | 13 | HB | 100/100 | x | 1T |
|  | 14 | 2H | 90/100 | ○ | 4T |
|  | 15 | 3H | 50/100 | ○ | 5T |
|  | 16 | 3H | 50/100 | ○ | 5T |

From the results listed in Table 8, it was confirmed that the monofunctional (meth)acrylic acid ester monomer was desirably used at a content of 50 to 90 parts by weight, based on 100 parts by weight of the total (meth)acrylic acid ester monomer, and flexural processability and adhesive strength were degraded when the content of the monofunctional (meth)acrylic acid ester monomer was less than 50 parts by weight, whereas hardness and scratch resistance were deteriorated due to a poor curing property when the content of the monofunctional (meth)acrylic acid ester monomer exceeded 90 parts by weight. Also, it was revealed that hardness and scratch resistance were deteriorated due to a poor curing property when the multifunctional (meth)acrylic acid ester monomer was used at a content of less than 20 parts by weight, whereas flexural processability and adhesive strength were degraded when the content of the multifunctional (meth)acrylic acid ester monomer exceeded 60 parts by weight.

TABLE 9

Experimental results (fingerprint adhesivity and fingerprint-erasing property)

|  |  | Fingerprint adhesivity | Fingerprint-erasing property |
|---|---|---|---|
| Examples | 13 | ○ | ○ |
|  | 14 | ○ | ○ |
|  | 15 | ○ | ○ |
|  | 16 | ○ | ○ |
|  | 17 | ○ | ○ |
|  | 18 | ○ | ○ |
| Comparative Examples | 17 | x | x |
|  | 18 | x | Δ |
|  | 19 | Δ | x |

As listed in Table 9, it was seen that the pure organic coating film showed further improved fingerprint adhesivity and fingerprint-erasing property by application of the inorganic nanoparticles when Comparative Example 4 in which the same composition as the radiation-curable resin composition of Example 4 was used to form an coating film was compared to Examples 13 to 18 in which the radiation-curable resin composition including the inorganic nanoparticles was used to form an coating film.

Also, it was revealed that fingerprint adhesivity was not significant when the inorganic nanoparticles having a particle size of 10 to 200 nm were used at an excessive amount in the case of Comparative Example 18.

In addition, it was seen that when only the inorganic nanoparticles having a particle size of 400 nm to 3 μm were used at an excessive amount in the case of Comparative Example 19, the coating film became matte to give a slightly improving effect of fingerprint adhesivity, but there was a degrading effect of fingerprint-erasing property since the fingerprint components permeated between the inorganic nanoparticles. Therefore, it was seen that the fingerprint-related physical properties were improved only when the inorganic nanoparticles were mixed at a proper amount in consideration of the size of the inorganic nanoparticles.

TABLE 10

Experimental results (adhesive strength, abrasion resistance, fingerprint adhesivity and fingerprint-erasing property)

|  |  | Adhesive strength | Abrasion resistance | Fingerprint adhesivity | Fingerprint-erasing property |
|---|---|---|---|---|---|
| Comparative Examples | 19 | ○ | ○ | ○ | ○ |
|  | 20 | ○ | ○ | ○ | ○ |
|  | 21 | ○ | ○ | ○ | ○ |
| Comparative Examples | 20 | ○ | x | x | x |
|  | 21 | x | ○ | Δ | Δ |

As listed in Table 10, it was confirmed that, in the case of Comparative Example 20 in which the inorganic nanoparticles were mixed at a content of less than 0.1% based on the total weight of the radiation-curable resin composition, fingerprint-resistant effect and abrasion resistance were not improved, and in the case of Comparative Example 21 in which the inorganic nanoparticles were mixed at a content of 15% or more, fingerprint-resistant effect was reduced and the other physical properties were adversely affected. Therefore, it is desirable that the inorganic nanoparticles are mixed at a content of 0.1% to 15%, based on the total weight of the radiation-curable resin composition.

The radiation-curable resin composition of the present invention has an effect of improving adhesivity and processability of the resin composition to apply to a metal material such as stainless steel.

Also, the present invention has effects of maintaining the metal material's excellent metal metallic gloss and simultaneously protecting the metal surface from contamination and fingerprints by treating the surface of a metal material, particularly, stainless steel, with the radiation-curable resin composition.

In addition, the resin composition cured by radiation is provided instead of the oil-type resin composition dried by heat so that it can be environmentally friendly by not using a solvent, and the productivity can be improved.

While the invention has been shown and described with reference to certain exemplary embodiments thereof, it will be understood by those skilled in the art that various changes in form and details may be made therein without departing from the scope of the invention as defined by the appended claims.

What is claimed is:
1. A radiation-curable base resin composition comprising:
a multifunctional urethane(meth)acrylate having three or more functional groups at 3 to 35 parts by weight;
a bifunctional urethane(meth)acrylate at 3 to 35 parts by weight;

at least one (meth)acrylic acid ester monomer selected from the group consisting of a monofunctional (meth)acrylic acid ester monomer and a multifunctional (meth)acrylic acid ester monomer at 20 to 60 parts by weight; and a radiation polymerization initiator at 0.1 to 15 parts by weight, wherein the multifunctional urethane (meth)acrylate having three or more functional groups is a mixture of a trifunctional urethane (meth)acrylate and a hexafunctional urethane (meth)acrylate, wherein the trifunctional urethane (meth)acrylate and the hexafunctional urethane (meth)acrylate are mixed at a weight ratio of 1:1 to 4:1, wherein the (meth)acrylic acid ester monomer is a mixture of a monofunctional (meth)acrylic acid ester monomer and a multifunctional (meth)acrylic acid ester monomer, and wherein the monofunctional (meth)acrylic acid ester monomer is present at a content of 50 to 90 parts by weight, and the multifunctional (meth)acrylic acid ester monomer is present at a content of 20 to 60 parts by weight, based on 100 parts by weight of the total (meth)acrylic acid ester monomer.

2. The radiation-curable base resin composition of claim 1, wherein the multifunctional urethane(meth)acrylate having three or more functional groups has an isocyanurate structure and a urethane bond in the structure.

3. The radiation-curable base resin composition of claim 1, wherein the multifunctional urethane(meth)acrylate having three or more functional groups is a reaction product of a multinuclear complex of alkylene diisocyanate and a (meth)acrylate having a hydroxyl group.

4. The radiation-curable base resin composition of claim 3, wherein the multinuclear complex of alkylene diisocyanate is a trimer of hexamethylene diisocyanate.

5. The radiation-curable base resin composition of claim 3, wherein the (meth)acrylate having a hydroxyl group is hydroxy alkyl(meth)acrylate or hydroxy polycaprolactone (meth)acrylate.

6. The radiation-curable base resin composition of claim 1, wherein the bifunctional urethane(meth)acrylate is a reaction product of an alicyclic or aromatic diisocyanate and a (meth)acrylate having a hydroxyl group.

7. The radiation-curable base resin composition of claim 6, wherein the alicyclic or aromatic diisocyanate is an isophorone diisocyanate, dicyclohexane diisocyanate, or hydrogenated xylene diisocyanate.

8. The radiation-curable base resin composition of claim 1, further comprising a bifunctional epoxy(meth)acrylate including an aromatic compound at 3 to 50 parts by weight, based on 100 parts by weight of the total base resin.

9. The radiation-curable base resin composition of claim 8, wherein the aromatic compound is derived from at least one aromatic compound selected from the group consisting of bisphenol A, Novolac, naphthalene and fluorene.

10. The radiation-curable base resin composition of claim 1, further comprising an adhesion-promoting monomer having at least one functional group selected from the group consisting of a carboxyl group, a hydroxyl group and a phosphate group, wherein the adhesion-promoting monomer is present at 0.1 to 15 parts by weight, based on 100 parts by weight of the total base resin.

11. A fingerprint-resistant resin composition comprising:
a radiation-curable base resin composition defined in claim 1 at 100 parts by weight; and
inorganic nanoparticles at 0.1 to 15 parts by weight.

12. The fingerprint-resistant resin composition of claim 11, wherein the inorganic nanoparticles have a particle size of 10 nm to 3 μm.

13. The fingerprint-resistant resin composition of claim 11, wherein the inorganic nanoparticles are a mixture of inorganic nanoparticles having a particle size of 10 nm to 300 nm and inorganic nanoparticles having a particle size of 400 nm to 3 μm.

14. The fingerprint-resistant resin composition of claim 11, wherein the inorganic nanoparticles are selected from silica, alumina, magnesium carbonate, calcium carbonate, talc, titanium oxide or a mixture thereof.

15. A fingerprint-resistant metal substrate comprising a coating layer formed on one or both surfaces thereof, wherein the coating layer is formed from the resin composition defined in claim 1.

* * * * *